United States Patent
Ooba (10) Patent No.: US 10,807,243 B2
(45) Date of Patent: Oct. 20, 2020

(54) ROBOT SYSTEM (71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 182 days.

(21) Appl. No.: 16/214,286

(22) Filed: Dec. 10, 2018

(65) Prior Publication Data
US 2019/0224851 A1 Jul. 25, 2019

(30) Foreign Application Priority Data
Jan. 25, 2018 (JP) .................. 2018-010754

(51) Int. Cl.
B25J 9/16 (2006.01)
B25J 9/00 (2006.01)
(Continued)

(52) U.S. Cl.
CPC .......... B25J 9/1679 (2013.01); B25J 9/0093 (2013.01); B25J 9/1694 (2013.01)

(58) Field of Classification Search
CPC ...... B25J 9/1679; B25J 9/0093; B25J 9/1694; G05B 2219/39102; G05B 19/4182;
(Continued)

(56) References Cited

U.S. PATENT DOCUMENTS 5,727,132 A 3/1998 Arimatsu et al.
5,908,283 A 6/1999 Huang et al.
(Continued)

FOREIGN PATENT DOCUMENTS

CN 104334479 A 2/2015
CN 104684823 A 6/2015
(Continued)

OTHER PUBLICATIONS

Chinese Office Action dated Mar. 18, 2020, in connection with corresponding CN Application No. 201910062734.5 (10 pgs., including machine-generated English translation).
(Continued)

Primary Examiner — Jaime Figueroa
(74) Attorney, Agent, or Firm — Maier & Maier, PLLC (57) ABSTRACT A robot system includes: a transport device; an article accumulating part that can block the article without stopping the operation of the transport device; a robot performing a task on the article in a working area defined on a downstream side; a control unit; an article-decelerating unit that can reduce the speed of the article in the working area; a detecting unit detecting the traveling distance of the article; a sensing unit that detects the position of the article on an upstream side; and a management unit that causes the article to be blocked and causes the speed of the article to be reduced when the management unit determines that the task will not be completed within the working area. The control unit calculates the current position of the article based on the position and the traveling distance and causes the robot to follow the article to complete the task.

5 Claims, 7 Drawing Sheets (51) Int. Cl.
 *G05B 19/418* (2006.01)
 *B65G 43/08* (2006.01)
 *B65G 47/88* (2006.01)

(58) Field of Classification Search
 CPC .. B65G 43/08; B65G 47/905; B65G 47/8807; B65G 2203/041; B65G 2203/044
 USPC .................................................. 700/245–264
 See application file for complete search history.

(56) References Cited

U.S. PATENT DOCUMENTS

| | | | |
|---|---|---|---|
| 6,120,241 | A | 9/2000 | Huang et al. |
| 6,286,656 | B1 | 9/2001 | Huang et al. |
| 6,290,454 | B1 | 9/2001 | Huang et al. |
| 9,289,897 | B2 * | 3/2016 | Mattern ................. B25J 9/0093 |
| 2002/0106273 | A1 | 8/2002 | Huang et al. |
| 2004/0165980 | A1 | 8/2004 | Huang et al. |
| 2004/0234360 | A1 * | 11/2004 | Hayashi ............ H01L 21/68707 414/217 |
| 2007/0007924 | A1 | 1/2007 | Nishihara et al. |
| 2008/0283370 | A1 * | 11/2008 | Monti ................. B65G 47/256 198/867.01 |
| 2010/0008754 | A1 | 1/2010 | Hartmann et al. |
| 2010/0094453 | A1 | 4/2010 | Nishihara et al. |
| 2012/0029688 | A1 * | 2/2012 | Lager ................. H04L 67/1002 700/230 |
| 2012/0323358 | A1 | 12/2012 | Izumi et al. |
| 2015/0203298 | A1 | 7/2015 | Matsumoto |
| 2016/0096273 | A1 | 4/2016 | Burns et al. |
| 2016/0096274 | A1 | 4/2016 | Baylor et al. |
| 2016/0096694 | A1 * | 4/2016 | Baylor ..................... B65B 5/06 414/774 |
| 2017/0157648 | A1 * | 6/2017 | Wagner ................. B65G 47/34 |
| 2017/0210570 | A1 * | 7/2017 | Lee ........................ B65G 13/10 |
| 2017/0238600 | A1 * | 8/2017 | Grant ........................ A24C 5/478 |
| 2017/0349385 | A1 * | 12/2017 | Moroni ................. B65G 47/918 |
| 2018/0014477 | A1 * | 1/2018 | Ensworth ................. B29C 48/92 |
| 2018/0117766 | A1 * | 5/2018 | Atohira ............. G05B 19/4182 |
| 2018/0215034 | A1 * | 8/2018 | Jean ................. G05B 19/4182 |
| 2019/0215427 | A1 * | 7/2019 | Yamamoto ........... G05B 19/418 |
| 2019/0308823 | A1 * | 10/2019 | Beer ...................... B65G 65/02 |
| 2020/0039756 | A1 * | 2/2020 | Kollmuss ............. B65G 47/086 |
| 2020/0156236 | A1 * | 5/2020 | Lager ..................... B25J 9/1605 |
| 2020/0164518 | A1 * | 5/2020 | Lager ..................... B25J 9/0093 |
| 2020/0180870 | A1 * | 6/2020 | Kirzinger ............... B25J 9/0093 |

FOREIGN PATENT DOCUMENTS

| | | |
|---|---|---|
| DE | 697 36 869 T2 | 5/2007 |
| DE | 10 2006 031 178 B4 | 8/2008 |
| EP | 1 211 203 A2 | 6/2002 |
| EP | 1 489 025 A2 | 12/2004 |
| EP | 2 144 127 A1 | 1/2010 |
| EP | 2 538 373 A2 | 12/2012 |
| EP | 2 144 127 B1 | 4/2014 |
| EP | 2 796 393 A1 | 10/2014 |
| GB | 2 428 035 A | 1/2007 |
| JP | H02-28623 U | 2/1990 |
| JP | H02-28823 U | 2/1990 |
| JP | H03-251719 A | 11/1991 |
| JP | H04-266316 A | 9/1992 |
| JP | H04-2664316 A | 9/1992 |
| JP | H07-315547 A | 12/1995 |
| JP | H08-39468 A | 2/1996 |
| JP | H08-63214 A | 3/1996 |
| JP | 2000-071188 A | 3/2000 |
| JP | 2002-308241 A | 10/2002 |
| JP | 2007-015055 A | 1/2007 |
| JP | 2009-107751 A | 5/2009 |
| JP | 2010-202291 A | 9/2010 |
| JP | 2013-000854 A | 1/2013 |
| JP | 2014-223718 A | 12/2014 |
| WO | 98/23511 A2 | 6/1998 |
| WO | 2017/147584 A1 | 8/2017 |

OTHER PUBLICATIONS

Japanese Decision to Grant a Patent dated Jan. 7, 2020, in connection with corresponding JP Application No. 2018-010754 (6 pgs., including machine-generated English translation).

Office Action dated Apr. 28, 2020 in corresponding German Application No. 10 2019 101 121.3; 9 pages including English-language translation.

* cited by examiner

ROBOT SYSTEM

CROSS-REFERENCE TO RELATED APPLICATIONS

This application is based on Japanese Patent Application No. 2018-010754, the content of which is incorporated herein by reference.

FIELD

The present invention relates to a robot system.

BACKGROUND

A known article supply apparatus in the related art transports and supplies articles one by one to a lift apparatus even if the articles are successively loaded on the starting end of a supply position (for example, see Japanese Unexamined Patent Application Publication No. Hei 7-315547).

This article supply apparatus includes a constantly operating first belt conveyor, a second belt conveyor that is disposed in front of the first belt conveyor and has a higher transporting speed than the first belt conveyor, a first stopper that switches between acceptance and rejection of the advance of an article transported by the first belt conveyor to the second belt conveyor, and a second stopper that is stationarily disposed to stop the article transported by the second belt conveyor at the position where the article is lifted by a lift apparatus.

In the article supply apparatus in Patent Literature 1, the position where the article is lifted by the lift apparatus is preliminarily set, and the lift apparatus performs a lifting task only in a state in which the second stopper stops the article.

SUMMARY

An aspect of the present invention is a robot system including: a transport device that transports an article in one direction; an article accumulating part that is disposed at an intermediate position of the transport device in a transport direction and that can block the article without stopping the operation of the transport device; a robot that performs a task on the article transported by the transport device in a working area defined on the downstream side of the article accumulating part in the transport direction; a control unit that controls the robot; an article-decelerating unit that can reduce the speed of the article in the working area; a traveling-distance detecting unit that successively detects the traveling distance of the article transported by the transport device; an article sensing unit that detects, on the upstream side of the working area, the position of the article; and a production management unit that monitors the task performed by the robot and causes the article accumulating part to block the article and causes the article-decelerating unit to reduce the speed of the article when the production management unit determines that the task will not be completed within the working area. The control unit calculates the current position of the article on the basis of the position of the article detected by the article sensing unit and the traveling distance of the article detected by the traveling-distance detecting unit and causes the robot to follow the calculated current position and to complete the task on the article.

DETAILED DESCRIPTION

A robot system 1 according to an embodiment of the present invention will be described below with reference to the drawings.

Figure 1:
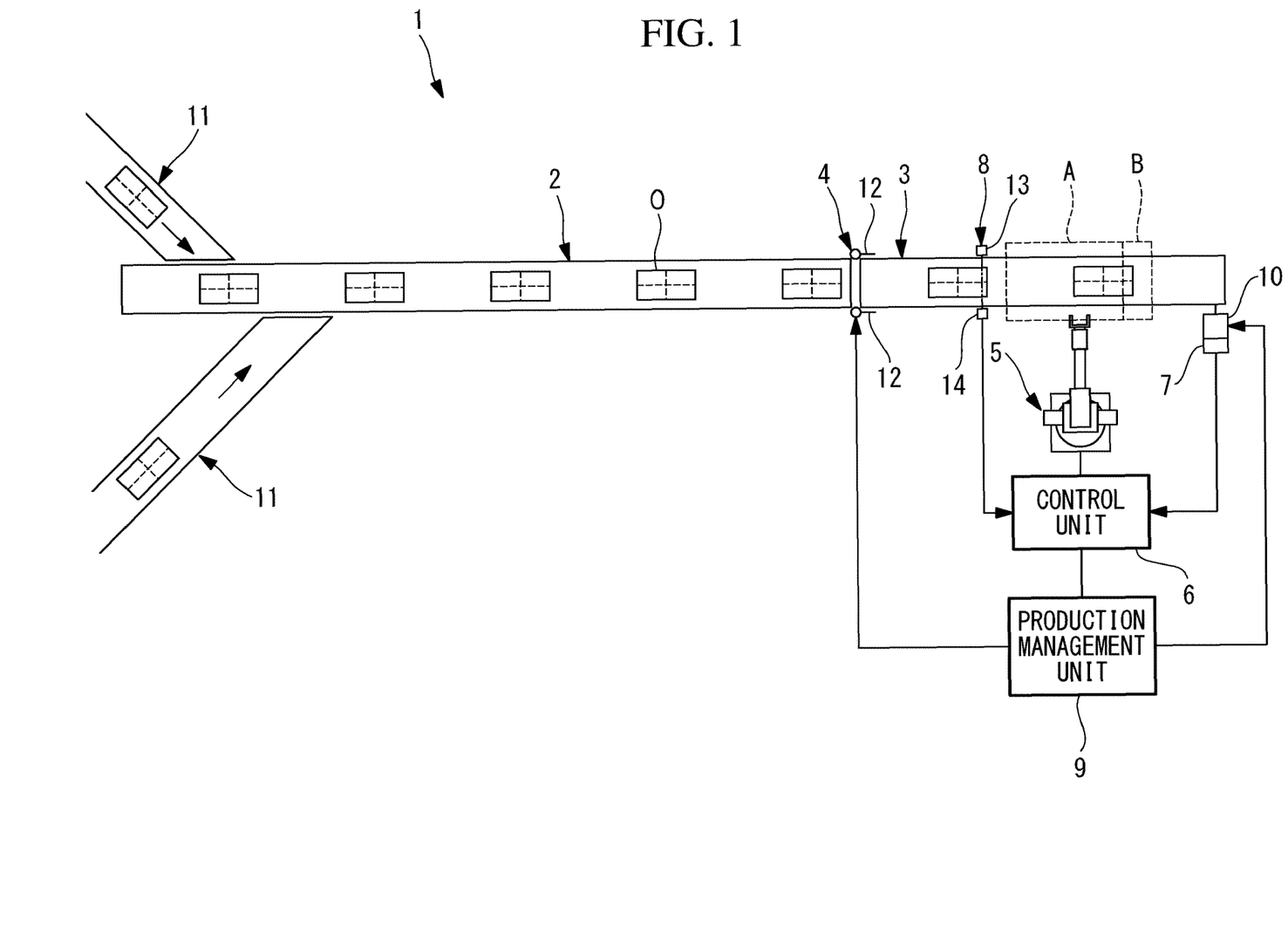
FIG. 1 shows the overall configuration of a robot system according to an embodiment of the present invention.

As shown in FIG. 1, the robot system 1 according to this embodiment includes: a first conveyor 2 and a second conveyor (transport device) 3, which are disposed in series and transport articles O in one direction; an article accumulating part 4 that is disposed at the boundary between the first conveyor 2 and the second conveyor 3; a robot 5 that is installed near the second conveyor 3 and performs a task on the article O that is being transported by the second conveyor 3, in a working area A defined on the second conveyor 3; and a control unit 6 that controls the robot 5.

The robot system 1 includes: an encoder (traveling-distance detecting unit) 7 that detects the traveling distance of an article O conveyed by the second conveyor 3; a sensor (article sensing unit) 8 that detects the passage of the article O on the upstream side of the working area A; a production management unit 9 that monitors the task performed by the robot 5; and a conveyor controller (article-decelerating unit: not shown) that switches between on and off states of a motor 10 of the second conveyor 3 on the basis of an instruction signal from the production management unit 9.

In the example shown in FIG. 1, the first conveyor 2 is a roller conveyor that is constantly operated at a constant speed to transport, in one direction, articles O transferred from one or more supply conveyors 11 disposed on the upstream side thereof.

The second conveyor 3 is a belt conveyor that is disposed on the downstream side of the first conveyor 2 and transports, in one direction, the articles O transported by the first conveyor 2 and transferred thereto. The second conveyor 3 is driven by the motor 10, and a conveyor controller switches between starting and stopping of the second conveyor 3.

The robot 5 is, for example, a six-axis articulated robot and has a hand, which can grip a storage object X, at the end of a wrist.

In this embodiment, the articles O are, for example, open-top containers. The robot 5 grips one storage object X in the hand and puts it in an article O transported by the second conveyor 3. The robot 5 puts four storage objects X in the article O while the article O is in the working area A.

The article accumulating part 4 has stoppers 12, which can advance into and be retracted from a space (transport space) in which the articles O are transported by the first conveyor 2 and the second conveyor 3, in accordance with instruction signals from the production management unit 9.

Figure 2:
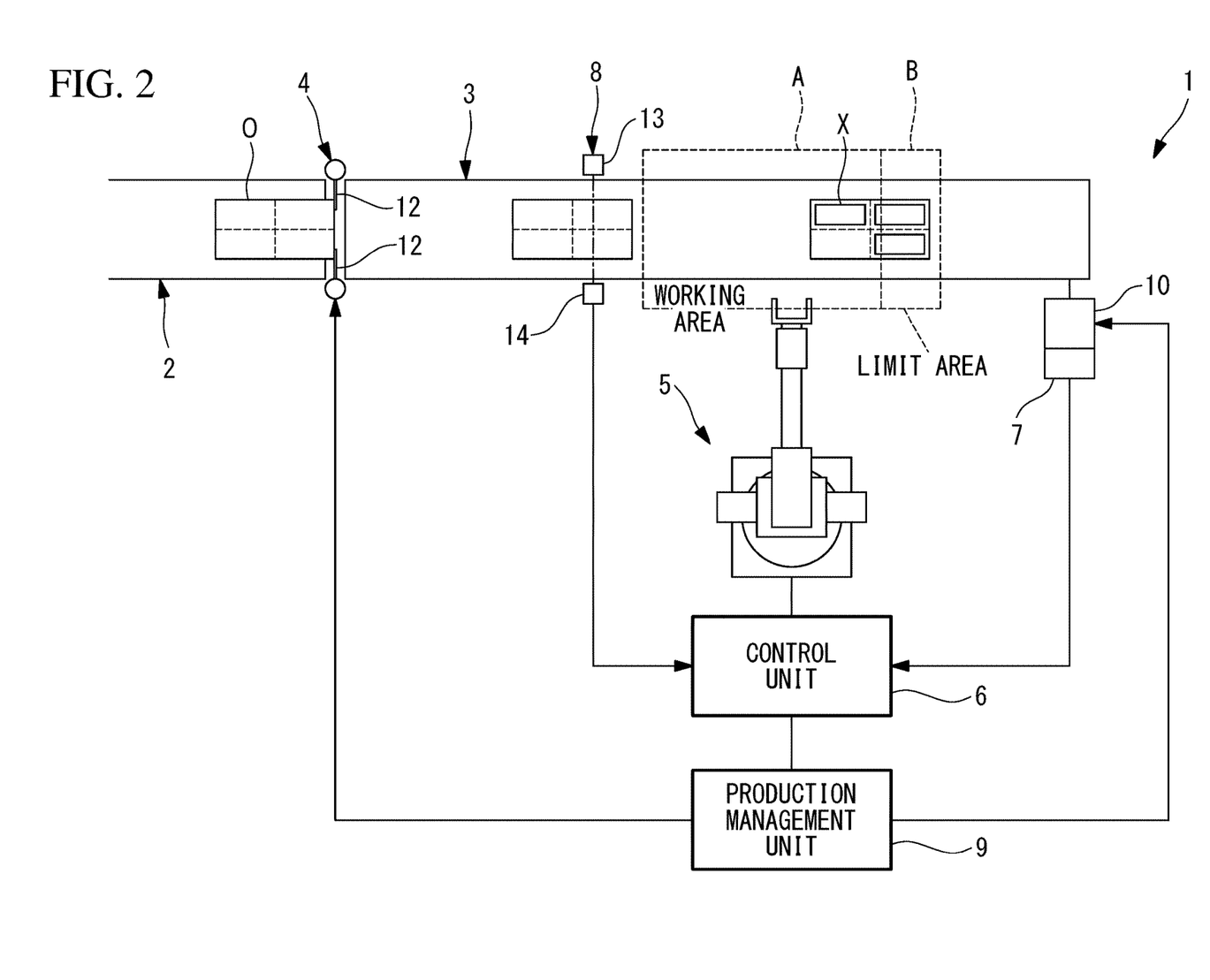
FIG. 2 is a partial enlarged view of the robot system in FIG. 1.

As shown in FIG. 2, when projected into the transport space, the stoppers 12 are located at a position where they come into contact with the downstream side surface of an article O transported by the first conveyor 2. The article O coming into contact with the stoppers 12 is blocked by the stoppers 12, while rollers (not shown) of the first conveyor 2 still rotate, whereby the article O is held in place in the state in which the first conveyor 2 continues to operate.

When retracted from the transport space, the stoppers 12 are located at a position where they do not block the travel of the articles O transported by the first conveyor 2.

The sensor 8 is, for example, an optical sensor that has an optical axis extending horizontally in the width direction of the second conveyor 3. The sensor 8 includes a light emitting part 13 and a light receiving part 14. When an article O passes between the light emitting part 13 and the light receiving part 14, the article O blocks the light, thus making it possible to detect the passage of the article O. The passage of the leading end of the article O is detected at the moment when a state in which the light receiving part 14 receives light is changed to a state in which the light receiving part 14 does not receive light, and the passage of the trailing end of the article O is detected at the moment when a state in which the light receiving part 14 does not receive light is changed to a state in which the light receiving part 14 receives light. The sensor 8 outputs a sensing signal when, for example, it detects the passage of the leading end of the article O.

The control unit 6 receives the sensing signal output from the sensor 8 and the traveling distance information output from the encoder 7. The control unit 6 specifies the position of the article O at the moment when the sensor 8 detects the leading end of the article O and specifies the current position of the article O based on the traveling distance of the article O from that moment, which is obtained by the encoder 7.

The control unit 6 operates, by means of tracking control, the robot 5 so as to follow the article O that is being transported by the second conveyor 3, according to an operation program taught in advance and to the specified current position of the article O to make the robot 5 perform a task of storing the storage objects X in the article O. The sensor 8 may be a camera. In that case, not only the position, but also the phase of the article O can be specified.

Figure 3:
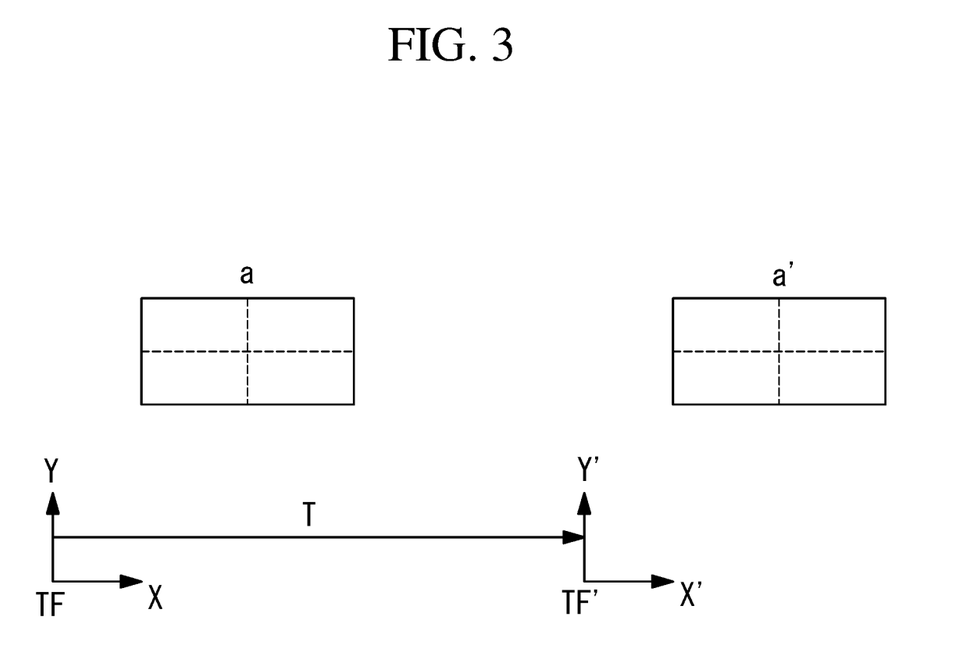
FIG. 3 is a diagram for explaining the coordinate system for tracking control of a robot in the robot system in FIG. 1.

The tracking control will be described here.

As shown in FIG. 3, when the sensor 8 detects an article O, a tracking coordinate system TF is defined for that article O, and a current tracking coordinate system TF' is defined. The tracking coordinate systems TF and TF' satisfy the following relational expression.

$$TF' = T \cdot TF$$

where T is a coordinate transformation matrix.

The component of the coordinate transformation matrix T is (e2−e1)/Scale, where e1 is the encoder count at the time when the sensor 8 detects the article O, e2 is the current encoder count, and Scale is a coefficient of transformation between the encoder count and the traveling distance.

In FIG. 3, reference sign a is the position of the article O, as viewed from the tracking coordinate system TF when the sensor 8 detects the article O, and reference sign a' is the position of the article, as viewed from the current tracking coordinate system TF'.

The robot 5 performs a task while following the article O with reference to the tracking coordinate system TF'.

The production management unit 9 is connected to the control unit 6 and constantly monitors the task performed by the robot 5. For example, as shown in FIG. 2, a limit area B is defined at the extreme downstream position in the working area A, and, when the article O enters the limit area B before the task performed by the robot 5 is completed, the production management unit 9 outputs a stop instruction signal to the article accumulating part 4 and the conveyor controller.

Upon receipt of the stop instruction signal, the article accumulating part 4 causes the stoppers 12 to project into the transport space to block the article O, thus preventing further advance of the article O into the second conveyor 3. The conveyor controller stops the motor 10 of the second conveyor 3 upon receipt of the stop instruction signal.

By doing so, it is possible to prevent the article O from flowing to the downstream side of the working area A before the task of storing the storage objects X is completed. Also in this case, because the traveling distance of the second conveyor 3 and the traveling distance of the article O are equal, the control unit 6 can specify the current position of the article O from the traveling distance obtained by the encoder 7, which is based on the position of the article O detected by the sensor 8, using the same control method as that used in the state in which the second conveyor 3 is operating, and thus, it is possible to cause the robot 5 to accurately follow the article O to perform a task.

When a signal reporting the completion of the task performed by the robot 5 is sent from the control unit 6 to the production management unit 9, the production management unit 9 outputs a release instruction signal to the article accumulating part 4 and the conveyor controller.

Upon receipt of the release instruction signal, the article accumulating part 4 retracts the stoppers 12 from the transport space to allow the blocked article O to enter the second conveyor 3. The conveyor controller restarts the operation of the motor 10 of the second conveyor 3 to discharge the article O stopped in the working area A, which has undergone the operation, to the downstream side and waits for a new article O to be detected by the sensor 8.

Figure 4:
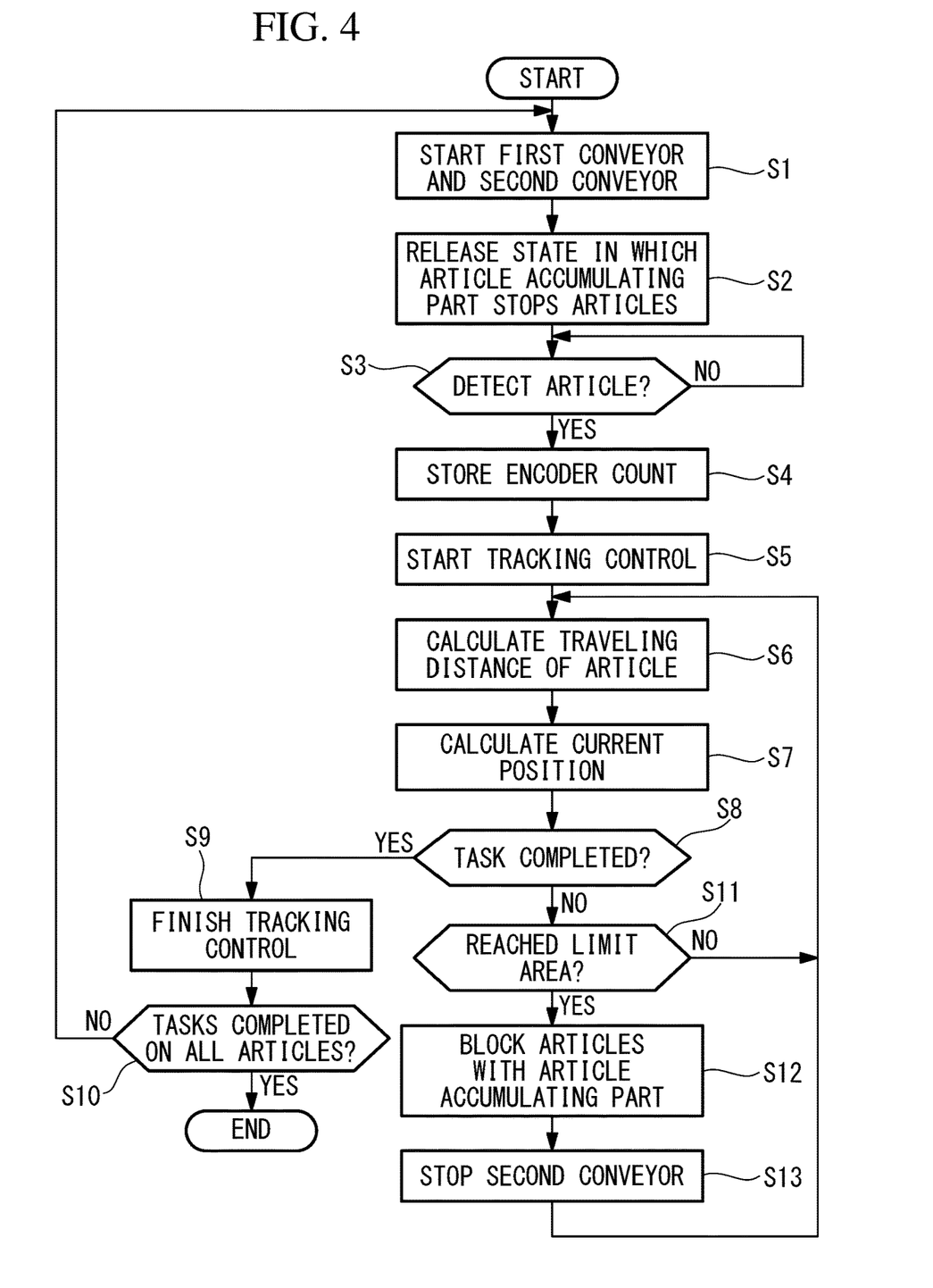
FIG. 4 is a flowchart showing the operation of the robot system in FIG. 1.

The operation of the robot system 1 according to this embodiment will be described.

As shown in FIG. 4, when the robot system 1 is actuated, the first conveyor 2 and the second conveyor 3 are started (step S1), and a state in which the article accumulating part 4 stops articles O is released (step S2).

Then, the system waits for the sensor 8 to detect the passage of an article O (step S3), the encoder count at the time when the article O is detected is stored (step S4), and tracking control of the robot 5 is started (step S5). In the tracking control, the traveling distance of the article O is calculated from the current encoder count and the encoder count at the time when the sensor 8 detects the passage of the article O (step S6), and the current position of the article O is successively calculated (step S7).

The production management unit 9 monitors the task performed by the robot 5 to determine whether the task is completed (step S8), and if the task is completed, the tracking control is finished (step S9). Then, it is determined whether the tasks have been completed on all the articles O (step S10), and if not, the process is repeated from step S1. If all the tasks on all the articles O have been completed, the operation of the robot system 1 is finished.

If it is determined that the task performed by the robot 5 is not yet completed in step S8, the production management unit 9 determines whether the article O has reached the limit area B (step S11). If the article O has not yet reached the limit area B, the process is repeated from step S6.

If it is determined that the article O has reached the limit area B, the production management unit 9 outputs a stop instruction signal to the article accumulating part 4 and the conveyor controller to cause the article accumulating part 4 to block the articles O (step S12) and to cause the conveyor controller to stop the second conveyor 3 (step S13). As a result, the article O stops in the working area A of the robot 5, and thus, the robot 5 can continue the task on the article O. Thereafter, the process is repeated from step S6.

As has been described above, in the robot system 1 according to this embodiment, because the transport device that transports the articles O in one direction is divided into the first conveyor 2 and the second conveyor 3, it is possible to block the articles O with the article accumulating part 4 and to stop only the second conveyor 3 with the conveyor controller, so that the task performed by the robot 5 on the article O is reliably completed. Because there is no need to stop the first conveyor 2 at this time, the supply of the articles O from the supply conveyor 11 is not delayed. Thus, it is possible to stabilize the production efficiency.

In this embodiment, when the article O has entered the limit area B, which is at the extreme downstream position in the working area A, the production management unit 9 determines that the task performed by the robot 5 will not be completed and stops the second conveyor 3. Instead, the production management unit 9 may slow down the second conveyor 3. Also in that case, because the traveling distance of the second conveyor 3 and the traveling distance of the article O are equal, the control unit 6 can cause the robot 5 to accurately follow the article O to perform a task. By doing so, it is possible to extend the operating time of the robot 5 and to complete the task without stopping the articles O, and thus, it is possible to further improve the production efficiency.

The production management unit 9 may be provided in the control unit 6.

Figure 5:
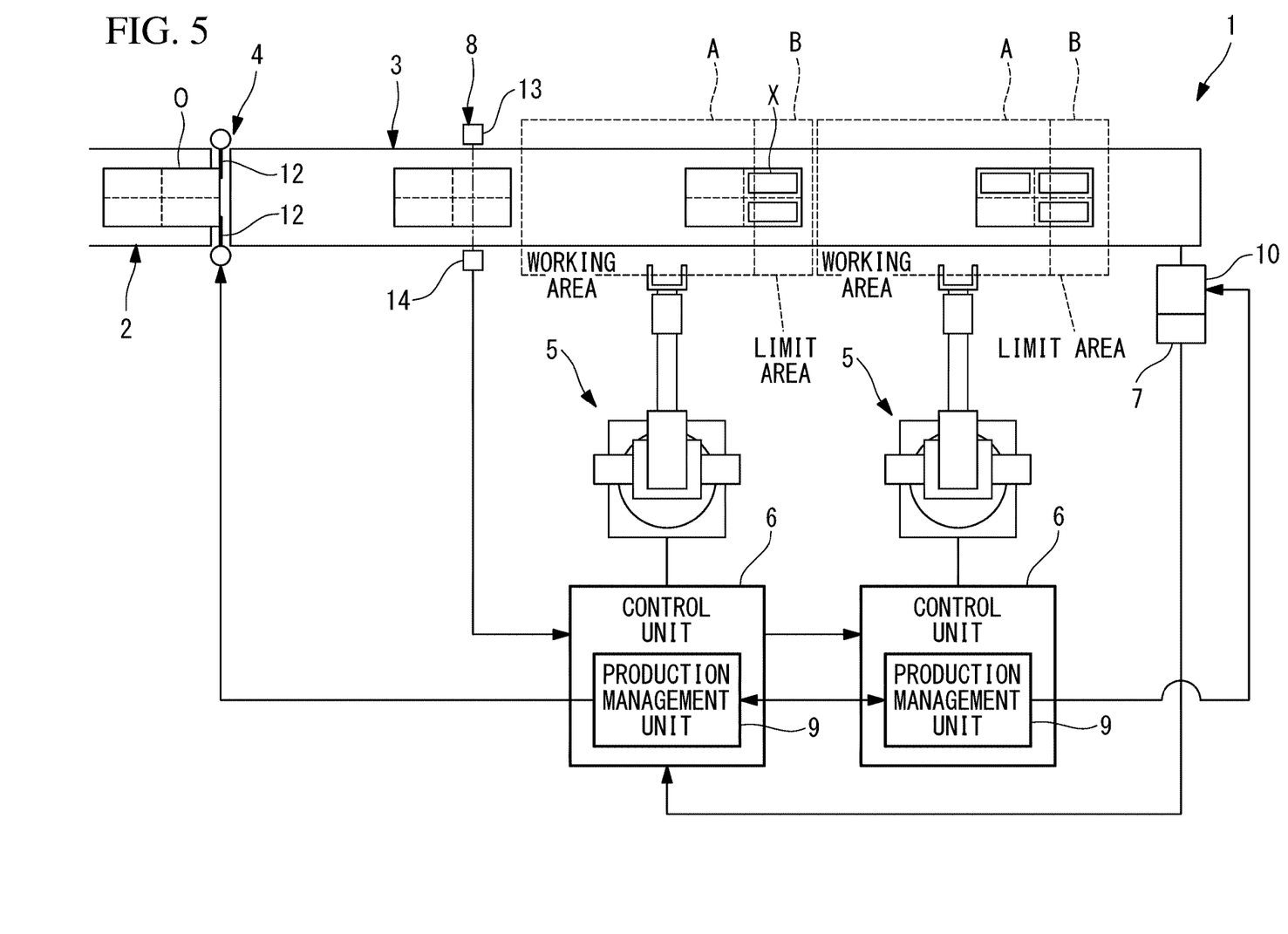
FIG. 5 is an enlarged view showing a first modification of the robot system in FIG. 1.

A plurality of robots 5 may be disposed near the second conveyor 3 to share the task. By doing so, the operation efficiency improves. In that case, as shown in FIG. 5, the system may be configured such that one control unit 6 calculates the current position of an article O based on the information from the sensor 8 and the encoder 7, and the other control unit 6 uses the calculated current position for the control of the robot 5.

Figure 6:
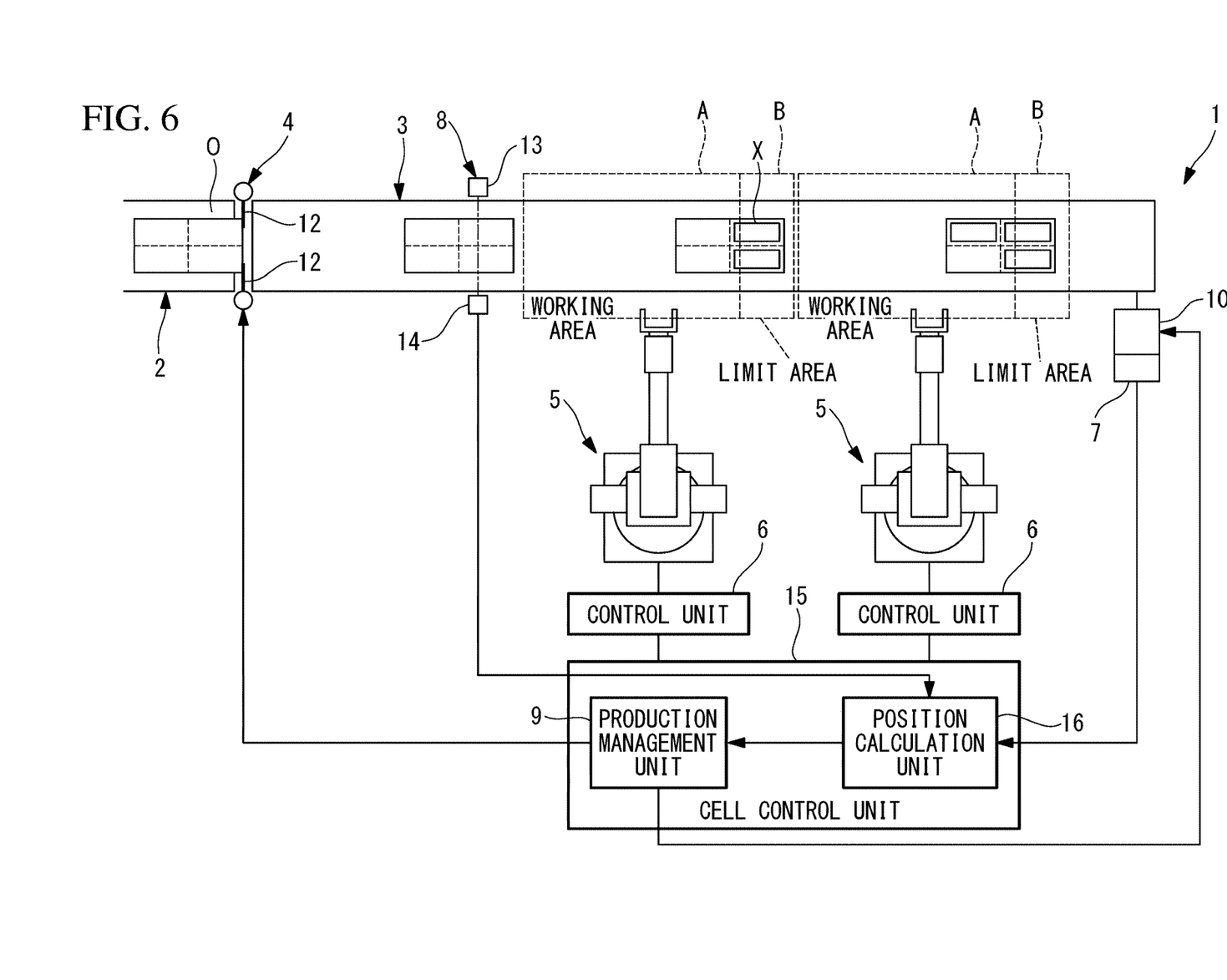
FIG. 6 is an enlarged view showing a second modification of the robot system in FIG. 1.

When a plurality of robots 5 are disposed near the second conveyor 3, as shown in FIG. 6, the present invention may be configured such that the control units 6 of the robots 5 are connected to a cell control unit 15, the cell control unit 15 is provided with the position calculation unit 16 for calculating the current position of an article O based on the information from the sensor 8 and the encoder 7, and the calculated current position is used in the control units 6 for the control of the corresponding robots 5. Furthermore, the present invention may be configured such that the production management unit 9 is also provided in the cell control unit 15 to collectively monitor tasks performed by all the robots 5 on the article O. By calculating, in the cell control unit 15, the current position of the article O, even if the power of any robot 5 is temporarily turned off for maintenance or other reasons, the task can be continued by other robots 5.

Figure 7:
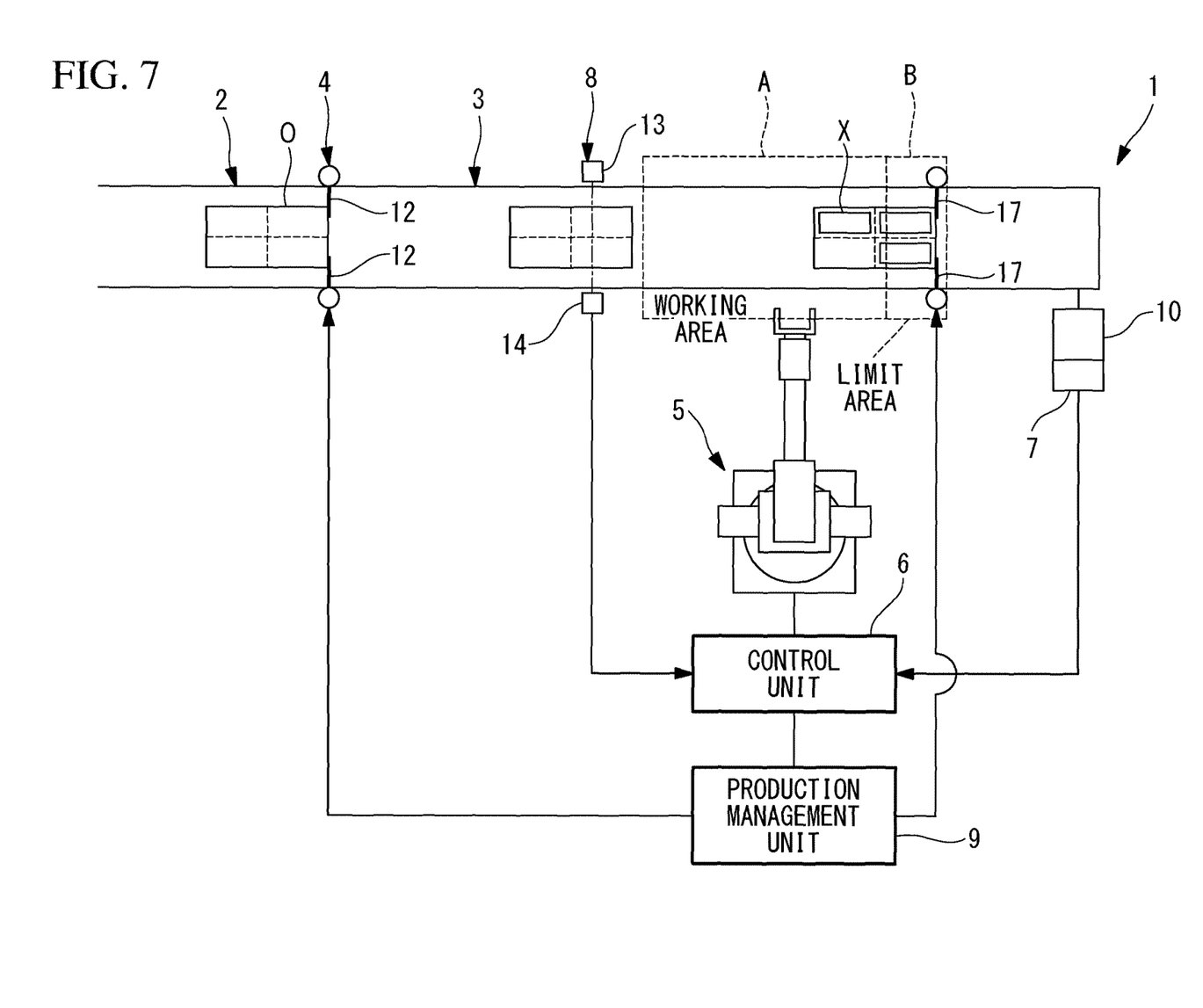
FIG. 7 is an enlarged view showing a third modification of the robot system in FIG. 1.

In this embodiment, to stop the article O within the working area A while continuing the operation of the transport device, the transport device is divided into the first conveyor 2 and the second conveyor 3. The first conveyor 2 is constantly operated, and the second conveyor 3 can be stopped. Instead, as shown in FIG. 7, a single, continuous roller conveyor may be used as the transport device, and stoppers 17, which can advance into and be retracted from the transport space and serve similarly to the article accumulating part 4, may be used as the article-decelerating unit, instead of the conveyor controller. Also this configuration makes it possible for the stoppers 17 to block an article O so as to be in the working area A, while continuing the operation of the transport device.

In this case, after the moment when the stoppers 17 block the article O, the traveling distance detected by the encoder 7 and the traveling distance of the article O do not match. However, the stoppers 17 are caused to project into the transport space in response to a stop instruction signal from the production management unit 9, and it is possible to calculate the traveling distance to when the stoppers 17 block the article O. Accordingly, in a state in which a stop instruction signal is output, the control unit 6 refers to the traveling distance obtained by the encoder 7 until the article O comes into contact with the stoppers 17 and, after the article O comes into contact with the stoppers 17, performs tracking control of the robot 5 assuming that the traveling distance is fixed to the value when the article O is blocked.

As a result, the above-described embodiment leads to the following aspect.

An aspect of the present invention is a robot system including: a transport device that transports an article in one direction; an article accumulating part that is disposed at an intermediate position of the transport device in a transport direction and that can block the article without stopping the operation of the transport device; a robot that performs a task on the article transported by the transport device in a working area defined on the downstream side of the article accumulating part in the transport direction; a control unit that controls the robot; an article-decelerating unit that can reduce the speed of the article in the working area; a traveling-distance detecting unit that successively detects the traveling distance of the article transported by the transport device; an article sensing unit that detects, on the upstream side of the working area, the position of the article; and a production management unit that monitors the task performed by the robot and causes the article accumulating part to block the article and causes the article-decelerating unit to reduce the speed of the article when the production management unit determines that the task will not be completed within the working area. The control unit calculates the current position of the article on the basis of the position of the article detected by the article sensing unit and the traveling distance of the article detected by the traveling-distance detecting unit and causes the robot to follow the calculated current position and to complete the task on the article.

According to this aspect, when an article is transported by the transport device, the article sensing unit detects the position of the article, and the traveling-distance detecting unit successively detects the traveling distance of the article. As a result, the control unit calculates the current position of the article within the working area, and the robot is caused to follow the calculated current position and to perform the task on the article.

The task of the robot is monitored by the production management unit. If the production management unit determines that the task will not be completed within the working area, such as when the robot task is delayed for some reason, the article accumulating part blocks articles so that no more articles enter the working area, and the article-decelerating unit reduces the speed of the article in the working area. By doing so, it is possible to ensure sufficient operating time of the robot, to compensate for the delay, and to complete the task within the working area.

Once the task is completed, the decelerated state created by the article-decelerating unit is released to transport the articles that have undergone the tasks to the downstream side of the working area, and the blockage of the articles by the article accumulating part is released to allow the blocked articles to enter the working area. By doing so, the robot can perform a task on a new article. In this case, because the article accumulating part blocks the article without stopping the operation of the transport device, the transportation of the articles can be continued on the upstream side of the blocked article. As a result, the supply of the articles to the transport device does not need to be stopped, thus preventing a decline in production efficiency.

In the above aspect, the article accumulating part may be a stopper that is provided so as to be able to advance into and be retracted from an article transport space, in which the article is transported by the transport device, and may be caused, on the basis of an instruction signal output from the production management unit, to project into the article transport space to block the article by coming into contact with the downstream side surface of the article.

With this configuration, it is possible to block, with the article accumulating part, the article while continuing the operation of the transport device and, on the upstream side of the blocked article, to continue the transportation without changing the article transportation speed.

In the above aspect, the transport device may include a first conveyor disposed on the upstream side of the article accumulating part and a second conveyor disposed on the downstream side of the article accumulating part, the traveling-distance detecting unit may successively detect the traveling distance of the article transported by the second conveyor, and the article-decelerating unit may decelerate the operation of the second conveyor on the basis of the instruction signal output from the production management unit.

With this configuration, it is possible to decelerate the operation of the second conveyor and, thus, to reduce the speed of the article in the working area, without affecting the article transportation state in the first conveyor, which is located on the upstream side of the article blocked by the article accumulating part. Then, the traveling distance decreased by decelerating the second conveyor is detected by the traveling-distance detecting unit, and it is possible to cause the robot to accurately follow the article and to complete the task.

In the above aspect, the article-decelerating unit may stop the operation of the second conveyor on the basis of the instruction signal output from the production management unit.

With this configuration, it is possible to stop the operation of the second conveyor to stop the article in the working area, without affecting the article transportation state in the first conveyor on the upstream side of the article blocked by the article accumulating part. Then, the stopping of the second conveyor is detected by the traveling-distance detecting unit, and it is possible to more reliably complete the task by the robot on the stopped article.

In the above aspect, the article-decelerating unit may be a stopper that is provided so as to be able to advance into and be retracted from the transport space, in which the article is transported by the transport device, and may be caused, on the basis of the instruction signal output from the production management unit, to project into the article transport space to stop the article by coming into contact with the downstream side surface of the article while the transport device is kept operating. The control unit may calculate the current position of the article on the basis of the position of the article detected by the article sensing unit, the traveling distance of the article detected by the traveling-distance detecting unit, and the instruction signal.

With this configuration, it is possible to block the article within the working area with the stopper, which constitutes the article-decelerating unit, while continuing the operation of the transport device. In addition to the position of the article detected by the article sensing unit and the traveling distance of the article detected by the traveling-distance detecting unit, the control unit accurately calculates the current position of the article on the basis of an instruction signal output from the production management unit. Thus, it is possible to complete the task performed on the article by the robot.

The present invention has an advantage in that a robot disposed near a transport device can efficiently perform a task on an article being transported by the transport device and can reliably complete the task on the article.

REFERENCE SIGNS LIST 1 robot system
2 first conveyor (transport device)
3 second conveyor (transport device)
4 article accumulating part
5 robot
6 control unit
7 encoder (traveling-distance detecting unit)
8 sensor (article sensing unit)
9 production management unit
12 stopper
A working area
O article

The invention claimed is:

1. A robot system, comprising:
a transport device that transports an article in one direction;
an article accumulating part that is disposed at an intermediate position of the transport device in a transport direction and that can block the article without stopping an operation of the transport device;
a robot that performs a task on the article transported by the transport device in a working area defined on a downstream side of the article accumulating part in the transport direction;
a control unit that controls the robot;
an article-decelerating unit that can reduce a speed of the article in the working area;
a traveling-distance detecting unit that successively detects a traveling distance of the article transported by the transport device;
an article sensing unit that detects, on an upstream side of the working area, a position of the article; and
a production management unit that monitors the task performed by the robot and causes the article accumulating part to block the article and also causes the article-decelerating unit to reduce the speed of the article when the production management unit determines that the task will not be completed within the working area,
wherein the control unit calculates a current position of the article on a basis of the position of the article detected by the article sensing unit and the traveling distance of the article detected by the traveling-distance detecting unit and causes the robot to follow the calculated current position and to complete the task on the article.

2. The robot system according to claim 1,
wherein the article accumulating part is a stopper, the stopper provided so as to be able to advance into and be retracted from an article transport space in which the article is transported by the transport device, and is caused, on a basis of an instruction signal output from the production management unit, to project into the article transport space to block the article by coming into contact with a downstream side surface of the article.

3. The robot system according to claim 1, wherein
the transport device includes a first conveyor disposed on the upstream side of the article accumulating part and a second conveyor disposed on the downstream side of the article accumulating part,
the traveling-distance detecting unit successively detects a traveling distance of the article transported by the second conveyor, and
the article-decelerating unit decelerates an operation of the second conveyor on the basis of the instruction signal output from the production management unit.

4. The robot system according to claim 3, wherein the article-decelerating unit stops the operation of the second conveyor on the basis of the instruction signal output from the production management unit.

5. The robot system according to claim 1, wherein
the article-decelerating unit is a stopper, the stopper provided so as to be able to advance into and be retracted from a transport space in which the article is transported by the transport device, and is caused, on a basis of an instruction signal output from the production management unit, to project into the article transport space to stop the article by coming into contact with a downstream side surface of the article while the transport device is kept operating, and
the control unit calculates the current position of the article on the basis of the position of the article detected by the article sensing unit, the traveling distance of the article detected by the traveling-distance detecting unit, and the instruction signal.

* * * * *